Dec. 22, 1953  R. GODILLON  2,663,200
CLUTCH DEVICE
Filed Jan. 27, 1948  3 Sheets-Sheet 3

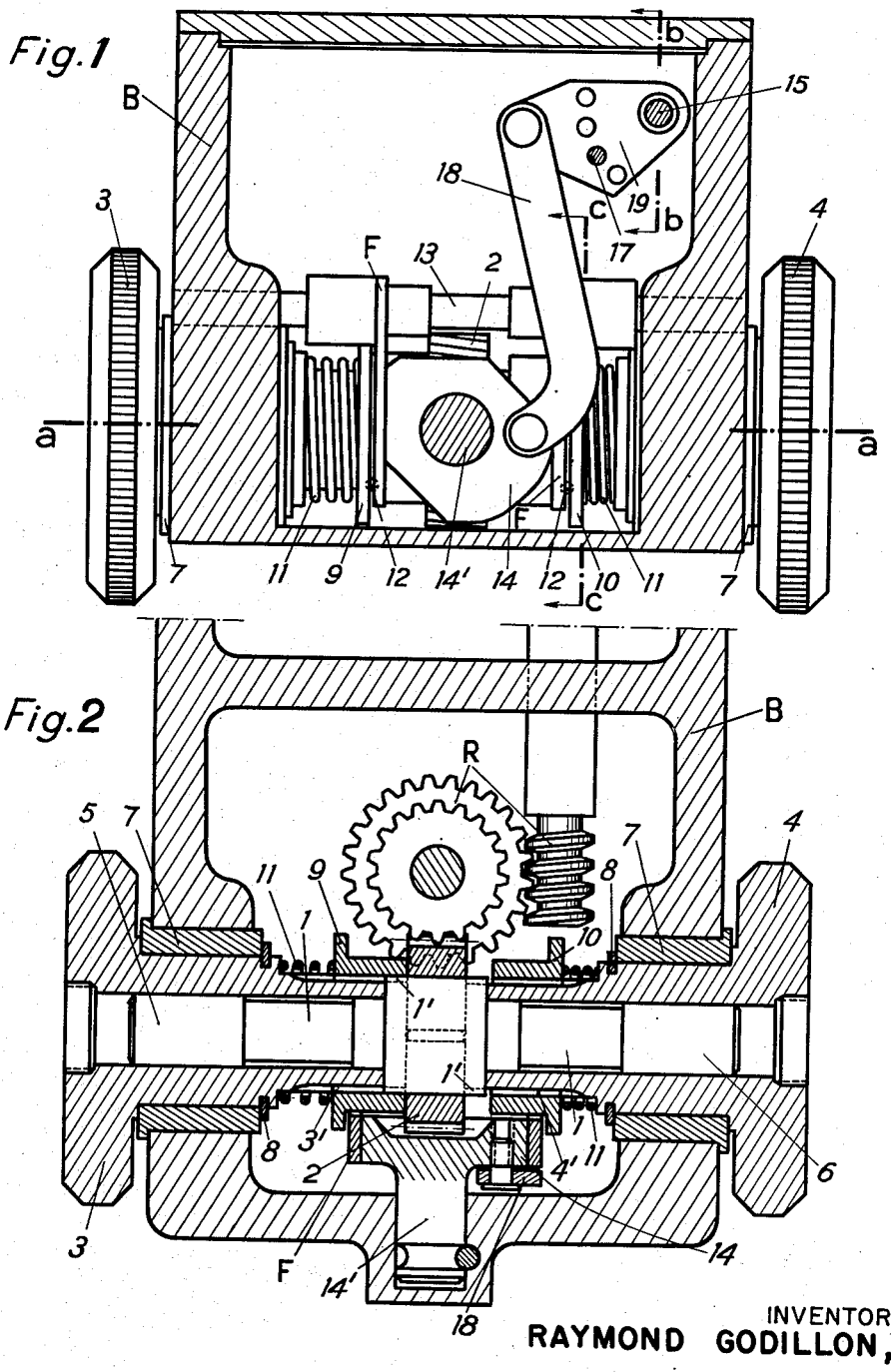

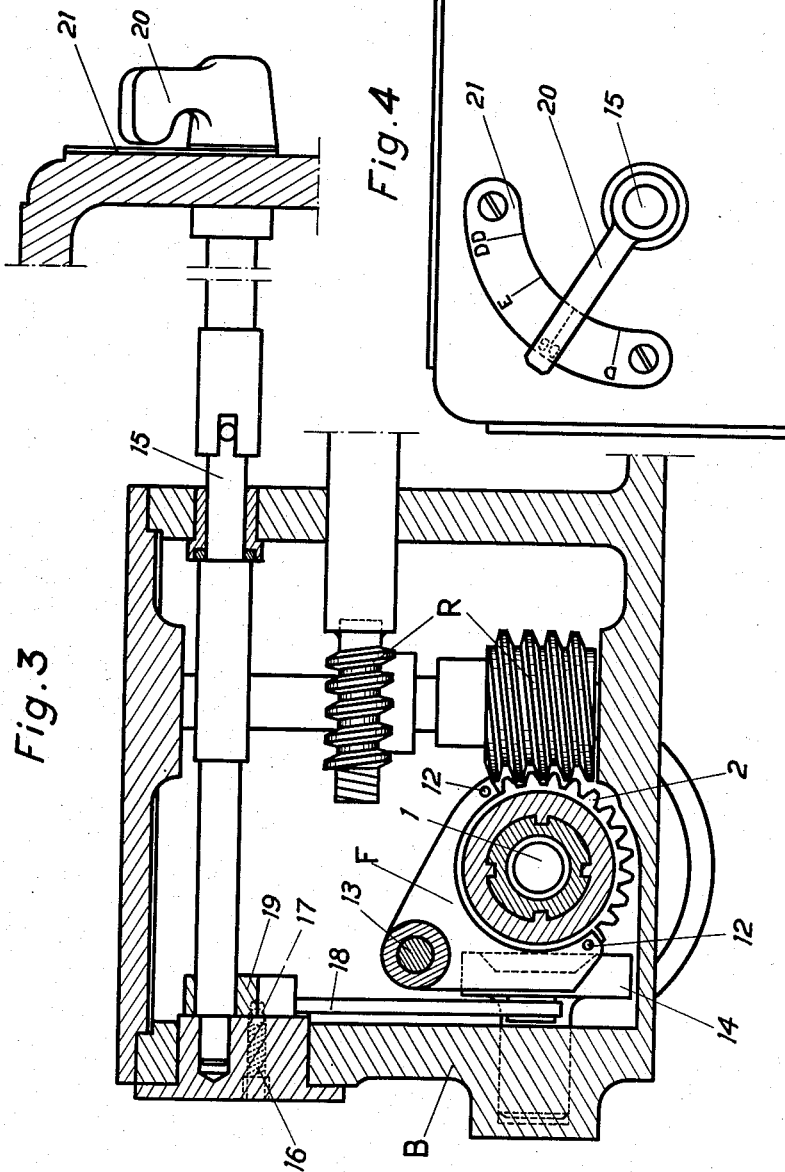

INVENTOR
RAYMOND GODILLON,
BY Stone, Boyden & Mack.
ATTORNEYS

Patented Dec. 22, 1953

2,663,200

UNITED STATES PATENT OFFICE 2,663,200

CLUTCH DEVICE

Raymond Godillon, Joinville-le-Pont, France, assignor to L'Air Liquide, Société Anonyme pour l'Etude et l'Exploitation des Procédés Georges Claude Application January 27, 1948, Serial No. 4,529

Claims priority, application France January 28, 1947

2 Claims. (Cl. 74—491)

This invention relates to clutch devices such as are used to rotate by the same shaft, two separate members, or both of said members, or either of said members, or neither the one, nor the other of said members.

The invention is particularly applicable to the driving wheels of the self-propelling carriages of oxy-acetylene cutting, welding or surface-hardening torches. Such self-propelling carriages essentially comprise a constant or variable speed electric motor, a change speed gear, a speed reducer, two driving wheels, two steering wheels, and guiding devices such as tracks. In this combination, should a constant speed motor be employed, or should the range of regulation of its speed be not sufficiently extensive, a speed varying gear will be employed. Such carriages also include means for engaging or disengaging the power transmission between the motor and the driving wheels. When both of these wheels are disengaged from the motor, the carriage may be rolled easily and quickly by hand in order to move it into its operating position. The prior art devices include usually a separate clutch for each of the driving wheels, which is necessary both when working in a straight line, owing to the differences in the profiles of the tracks which cause differences in the rolling diameters of the wheels, and when working along a curve, owing to the differences in the travel effected by each of the wheels.

It is an object of this invention to provide a clutch device for two members in which the engagement or disengagement of the two driving wheels can be effected, separately or not, merely by actuating a single lever.

A further object of this invention is to locate this single control lever at the rear of the carriage, making it easy for the operator to reach the same.

Further objects of my invention will become apparent from the embodiment thereof illustrated in the accompanying drawings.

In the drawings, Figure 1 is an elevational general view of an embodiment of the invention applied to a self-propelled oxyacetylene cutting carriage, in partial section in front of the driving axle;

Figure 2 is a horizontal section along the line a—a of Figure 1;

Figure 3 is a vertical section along the line b—b—c—c of Figure 1, showing the control for the engagement and the disengagement of the driving wheels;

Figure 4 is an elevational view showing the control lever with its dial; and

Figure 5:
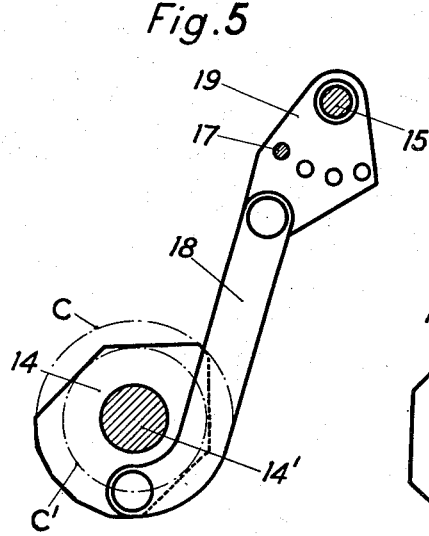
Figures 5, 6, 7 and 8 show the possible positions of the means, i. e. a cam, for actuating the engaging means.

The driving axle 1 (see Fig. 2) is provided on its medial portion with fine teeth 1' and receives its movement from a motor (not shown) by means of a speed reducer R and a pinion 2 secured to same. The two driving wheels 3 and 4 are mounted loose on the journals 5 and 6 of the axle and their hubs rotate in bushes 7 secured to the framework B of the carriage, held in position by retaining means 8. The ends of the hubs which are turned towards the medial portion of the axle are provided on the outside with teeth 3', 4' which are identical to those of the axle. Two sleeves 9 and 10, provided with internal teeth corresponding to the teeth 1', 3' and 4', are adapted to slide on the toothed portions of the axle and of the hubs of the wheels. It will immediately be understood that when the sleeves 9 and 10 are urged towards the medial portion of the axle, the wheels 3 and 4 are secured to the axle. When only the sleeve 9 is retracted, the wheel 3 is disengaged. When only the sleeve 10 is retracted, the wheel 4 is disengaged, and finally when both sleeves are retracted, both wheels are disengaged. Two springs 11 tend to urge the sleeves into the engaged position of the wheels. Two forks F, adapted to slide on a stationary spindle 13 and moved by a cam 14 provided with a pivot 14' integral therewith, effect the disengagement of the two wheels 3 and 4 separately or not. Ball bearings 12, set in the end of the arms of the forks, reduce the friction on the faces of the sleeves 9 and 10.

Figure 6:
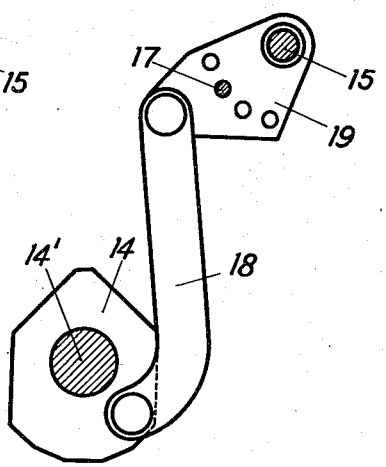
Figure 7:
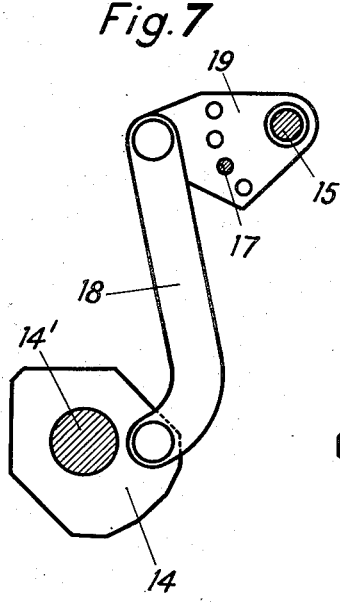
Figure 8:
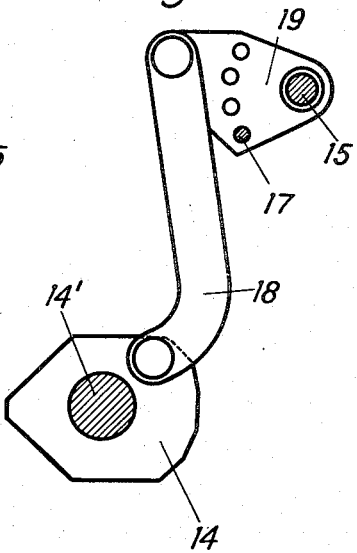

The cam 14, as shown in Figs. 5–8, is preferably of generally irregular octagonal contour with an axis of symmetry, all the angles at the apex of the octagon being equal to 135°. Two sides of the octagon at right angles to the axis of symmetry and two sides inclined at 45° to said axis are tangential to an ideal circle C (Figure 5), the diameter of which circle corresponds to the maximum distance between the two sleeves 9 and 10, that is, equal to the distance between the two forks F when these have driven apart the two sleeves at the maximum distance, which results in the disengagement of the sleeve and hub teeth. Two sides of the same octagon, parallel to the axis of symmetry, and two sides inclined at 45° to said axis, are tangential to an ideal circle C', the diameter of which corresponds to the minimum distance between the two sleeves 9 and 10.

Said cam 14 is actuated by the connecting rod and crank system 18, 19. The crank 19 is provided with four recesses in which a ball 17 urged by a spring 16 is adapted to engage in order to provide an efficient locking in each position, and, at the same time, an easy operation. The shaft 15 (Fig. 3) is manually actuated by means of a lever 20, the various positions of which are marked on a dial 21 (Fig. 4) mounted on the external rear portion of the casing, the position D corresponding to complete disengagement, DG to the disengagement of the left wheel, E to complete engagement and DD to disengagement of the right wheel.

The carriage operates as follows: The wheels being completely disengaged, i. e. the cam 14 being in the position of Fig. 8, said carriage is rolled by hand to the starting point of the work, holding it by the operating handle. Then, without releasing said handle, the lever is placed in the required position for effecting the work, i. e. either in the complete engagement position or in the position in which one or the other of the wheels is in engagement. The switch (not shown) is then actuated in order that the carriage be driven by means of the motor. The movement of the lever from one position to another position which is not immediately adjacent is of course effected without stopping at the intermediate position or positions. Thus for example in order to move from the position DD (Fig. 4) to the position DG, the lever is given a continuous swing in an anti-clockwise direction and then to move it into the position E, it is rotated in a clockwise direction. In order to change from one wheel to the other in the case of a travel comprising a point change from one position to another, it is only necessary, while the trolley is in motion, to swing the lever into its required position.

Although the invention has been described in connection with oxy-acetylene cutting carriages, it is to be understood tht the invention is not limited to carriages of this type but is applicable to other devices comprising members which must be independently clutched, or not, on the same shaft.

Various other embodiments embodying the invention will occur to those skilled in the art, and it is the intent to cover by the appended claims all such modifications and variations which come within the true spirit and scope of the invention.

What I claim as new and desire to secure by Letters Patent of the United States is:

1. In a manual control device of the character described, in combination, two opposite sliding members arranged along a common axis a cam member journalled according to an axis at right angle with the axis common to the sliding members, a fork interposed between each sliding member and the peripheral surface of the cam member, and adapted to freely slide in a parallel direction to the sliding direction of the sliding members, spring means adapted to constantly urge each sliding member and the adjacent fork in mutual engagement with the peripheral surface of the cam member, a single manual operating member adapted to rock about an axis parallel to the rotation axis of said cam member, means for coupling said operating member and the cam member in order to vary the angular position of the latter, and means for selectively locking said operating means in any of the control positions of said cam member.

2. In a manual control device of the character described, in combination, two opposite sliding members mounted upon said driving shaft and permanently rotatively coupled a cam member journalled according to an axis at right angle with the axis common to the sliding members, and having a general octagonal periphery, the cam faces of which are distributed in pairs of opposite faces, spring means adapted to constantly urge said sliding members in engagement with the faces of one of said pairs, a single manual operating member adapted to rock about an axis parallel to the rotation axis of said cam member, means for coupling said operating member and the cam member in order to vary the angular position of the latter, and means for selectively locking said operating means in any of the control positions of said cam member.

RAYMOND GODILLON.

References Cited in the file of this patent

UNITED STATES PATENTS

| Number | Name | Date |
|---|---|---|
| 420,160 | Lafaelle | Jan. 28, 1890 |
| 1,463,445 | Smith | July 31, 1923 |
| 1,549,293 | Campodonico | Aug. 11, 1925 |
| 1,850,972 | Tracy et al. | Mar. 22, 1932 |
| 2,025,298 | Millward | Dec. 24, 1935 |
| 2,033,996 | Olson et al. | Mar. 17, 1936 |
| 2,055,860 | Faries et al. | Sept. 29, 1936 |
| 2,326,796 | Panish | Aug. 17, 1943 |
| 2,435,536 | Ferris | Feb. 3, 1948 |

FOREIGN PATENTS

| Number | Country | Date |
|---|---|---|
| 14,468 | Great Britain | 1906 |